United States Patent Office 3,113,560
Patented Dec. 10, 1963

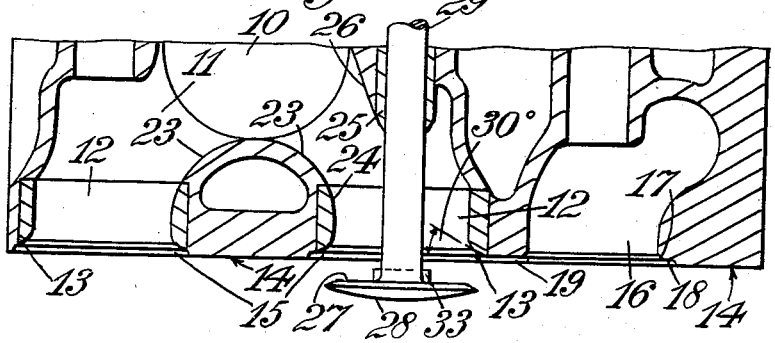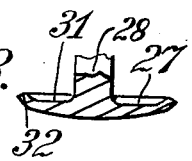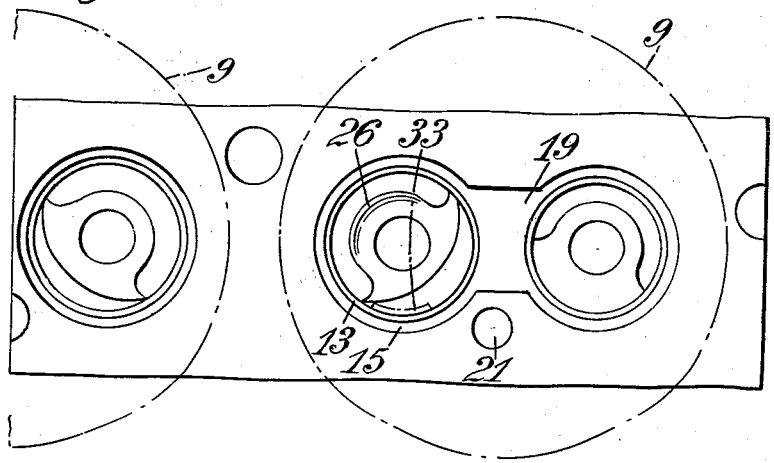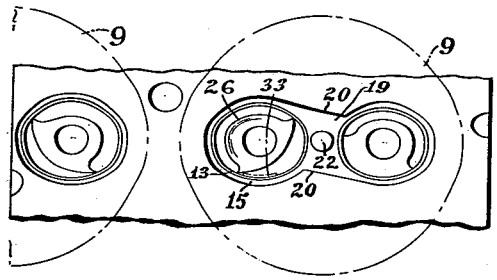

3,113,560
INTERNAL COMBUSTION ENGINES HAVING SIDE BY SIDE INLET AND EXHAUST PORTS
Henry Weslake, Harbour Road, Rye Harbour, Sussex, England
Filed Sept. 22, 1960, Ser. No. 58,599
Claims priority, application Great Britain Sept. 22, 1959
6 Claims. (Cl. 123—32)

This invention relates to internal combustion engines having side by side inlet and exhaust ports and particularly to compression ignition engines. An object of the invention is to improve the combustion of the charge in the engine cylinder. Effective combustion depends inter alia on the temperature of the charge before combustion takes place which temperature in its turn depends on the degree of compression and the temperature of the surfaces into which the charge comes into contact.

According to this invention an internal combustion engine having side by side inlet and outlet ports is characterised in that at least the valve seat associated with the inlet port is countersunk below the general surface of the wall in which it is formed and a channel is formed in said surface extending from an edge of the inlet valve seat to an edge of the exhaust valve seat. This arrangement is particularly applicable to an engine provided with poppet valves and it is found that the gas flowing through the inlet port is directed by the channel over the head of the hot exhaust valve and becomes heated whereby the subsequent combustion is improved. This is particularly the case in compression ignition engines in which air is introduced through the inlet valve which air is thus initially heated in flowing over the exhaust valve and its temperature is then further raised by compression so that effective combustion of fuel takes place immediately the fuel is injected into the hot compressed air. The improved combustion is specially evident when petrol is used as a fuel since its temperature requires to be raised to a higher degree than for heavy oil before combustion takes place. The arrangement is also particularly applicable to overhead valve engines.

It will be appreciated that when reference is made in a specification to gas flowing through the inlet port this is intended to include both air and a combustible mixture.

Preferably the valve seats of both the inlet port and exhaust port are countersunk beneath the general surface of the inner face of the cylinder head. For example they may be located in circular depressions of slightly greater diameter than the maximum diameter of said seats.

The width of the channel is preferably less than the diameter of the valve ports. The aforesaid channel may be straight sided. The centre line of the channel may intersect the axes of the ports or may be inclined to a line joining said axes. For example in the case where the exhaust valve seat is also disposed in a circular depression in said wall one side of the channel may be tangential or nearly tangential to the circular inlet depression and inclined to a tangent where it meets the circular exhaust depression and the other side is tangential or nearly tangential to the exhaust depression and inclined to a tangent where it meets the inlet depression so that gas flowing into the recess from the channel has a degree of swirl imparted to it so as to increase the transfer of heat to the gas from the exhaust valve.

The flow of gas through the channel may be increased by suitably shaping the wall of the inlet port and/or a valve guide which projects into the port so that the gas is directed towards the channel.

It is also found that the heating effect on the gas may be enhanced by making the cone angle of the conical face of the inlet valve seat and of the seating faces on the valve head less than the usual 45° for example the angle may be about 30°.

Also the heating effect may be enhanced by making the greater part of the undersurface of the head of the inlet valve substantially flat except for a radius where it meets the valve stem or the greater part of the surface may be concavely curved so as to provide an upstanding rim on which the seating surface of the head is formed. This also has the effect of directing the gas into the aforesaid channel.

In the case of an engine provided with means for the solid injection of fuel the opening in the cylinder head for the fuel injection nozzle is disposed close to or within the channel between the two valve ports.

The following is a description of one embodiment of the invention as applied to a solid injection petrol four stroke internal combustion engine, reference being made to the accompanying drawings in which:

FIGURE 1 is a section through the cylinder head;

FIGURES 2a and 2b are underplans of a part of the cylinder head as shown in FIGURE 1, showing alternative embodiments; and FIGURE 3 is a part section and part elevation of an alternative form of inlet valve.

The inlet manifold of the engine (not shown) is arranged to feed a number of branch passages in the cylinder head, one of which passages is indicated at 10 in FIGURE 1. This passage in its turn feeds inlet passages 11 leading two adjacent engine cylinders 9 (FIGURE 2). The inlet passages 11 lead to inlet ports 12 which terminate in conical valve seats 13 the faces of which are at an angle of about thirty degrees to a plane at right angles to the axis of the port as compared with the usual angle of 45°. The valve seats are countersunk below the main inner face 14 of the cylinder head and are encircled by circular recesses 15. Likewise the exhaust port 16 adjacent each inlet port terminates in a conical valve face 17 which is countersunk below the inner face 14 of the cylinder head and is encircled by a recess 18. The underface of the cylinder head is cut away between the adjacent recesses 15 and 18 to form a straight sided channel 19 the width across the sides of the channel being less than the diameter of the inlet port. The centre line of the passage intersects the axes of the inlet and exhaust ports as shown in FIGURE 2a. Alternatively, the sides of the passage may be inclined to a line, intersecting the centre lines of the ports as indicated by FIGURE 2b.

A socket 21 for the solid fuel injection nozzle may be disposed close to the channel 19 or may open into the channel as indicated by the circle 22.

The wall 23 of the inlet passage and the wall 24 of the inlet port together with the inlet valve guide 25 and supporting boss 26 may be so shaped that the inlet air flowing from the branch passage 10 to the inlet passage and inlet port is directed towards the channel 19. The inner face 27 of the head 28 of the inlet valve may be substantially flat over the greater part of its surface and joins the stem 29 of the valve in a small radius the outer surface may be slightly domed. Alternatively, as shown in FIGURE 3 the inner face of the valve head may be concavely curved as indicated at 31 so as to form a rim 32 around which the seating of the valve head extends.

Each inlet valve is provided with a small part-cylindrical mask 33 extending upwardly from its seating face and subtending an angle of about forty-seven degrees, the valve being so located that the mask takes up a position on the same side of the inlet port as the fuel injection nozzle socket 21 and the mask is symmetrically disposed in relation to a line intersecting the axis of the valve and at right angles to a line intersecting the axes of the inlet valve and exhaust valve.

As indicated at the commencement of the specification effective combustion depends inter alia on the temperature of the charge before combustion takes place which temperature in its turn depends on the degree of compression and the temperature of the surfaces into which the charge comes into contact. One of the hottest surfaces within the combustion space is the head of the exhaust valve and the applicant's arrangement ensures that as large an amount as possible of the combustible charge flows over the head. This is achieved by providing the surface in substantially the shortest path between the inlet port recess 15 and exhaust port recess 18 which channel is free of inflections and obstructions and thus there is little restriction to the flow of the charge once it has entered the channel. In order to ensure that as great an amount as possible of the charge may be directed into the channel and thus heated by the exhaust valve head, three features are provided.

The supporting boss 26 is so shaped that the inlet air flowing from the branch passage 10 to the inlet passage and inlet port is directed toward the channel and thus an appreciable part of the air flows into the channel rather than entering the cylinder directly. In order to enhance the directive effect of the valve it is formed with a mask 33 which is so located particularly in relation to the bulge of the supporting boss 26 that it directs any of the air flowing transversely to the channel, into the channel.

Not only is it desirable to heat the air constituent of the charge but also the fuel constituent. The conventional fuel injector spreads the fuel in fan-like manner and thus in order that the maximum amount of fuel may enter the air flowing toward the exhaust valve head the passage 22 is disposed adjacent and preferably in the channel 19 so that it is swept by the air over the exhaust valve head.

It will thus be seen that the shape of the inlet passage, the location of the mask, the shape of the channel and inlet valve and the location of injection means all contribute to the maximum amount of charge flowing over the exhaust valve head and being heated thereby.

With the above arrangement the engine without alteration may be used with a wide range of fuels such as petrol, diesel oil, fuel for jet engines or even light lubricating oil, the only modification required is in adjustment of the pump delivery.

I claim:

1. An internal combustion engine comprising a cylinder head in which are formed, for each cylinder, inlet and outlet ports spaced apart side by side and which ports are encircled by conical valve seats countersunk below an inner face of the cylinder head, inlet and exhaust valves co-operating with said valve seats and which inner face of the cylinder head is formed with a channel extending between the inlet and outlet ports, said inlet and exhaust valves having heads having conical seats thereon, said seats on the inlet valve heads and around the inlet ports having faces which subtend an angle of less than 45° to a plane at right angles to the axis of the respective inlet port, and which inlet valve is formed with a small part cylindrical mask subtending an angle of about 47° and which valve is disposed so as that said mask imparts a required degree of swirl to the inflowing gas.

2. An internal combustion engine according to claim 1 wherein said mask is symmetrically disposed on either side of a line at right angles to a line joining the axes of the adjacent inlet and outlet ports.

3. An internal combustion engine comprising a cylinder head in which are formed for each engine cylinder inlet and outlet ports spaced side by side and which ports are encircled by conical valve seats countersunk below an inner face of the cylinder head, and which inner face is formed with a channel extending between the inlet and outlet ports, said inlet and exhaust valves having heads having conical seats thereon, said seats on the inlet valve heads and around the inlet ports having faces which subtend an angle of less than 45° to a plane at right angles to the axis of the respective inlet port, and which cylinder head is provided with means for solid injection of fuel and with a passage for said fuel having an opening disposed close to the channel between the two valve ports.

4. An internal combustion engine comprising a cylinder head in which are formed, for each engine cylinder, inlet and outlet ports spaced apart side by side and which ports are encircled by conical valve seats countersunk below an inner face of the cylinder head to a depth approximating to the thickness of the valve head, which valve seats are disposed in circular depressions of slightly greater diameter than the seats and a channel is formed in said inner face between said circular depressions which channel is of like depth to the countersinking of the valve seats and is uniform in width and less than the diameter of the valve seat and its center line intersects the axes of the inlet and outlet port, and inlet and outlet poppet valves respectively associated with said inlet and outlet ports and valve seats and having heads having cooperating conical seats on the heads thereof which conical seats on the inlet valve heads and around the inlet ports have faces which subtend an angle of less than 45° to a plane at right angles to the axis of the respective inlet port.

5. An internal combustion engine comprising a cylinder head in which are formed, for each engine cylinder, inlet and outlet ports spaced apart side by side and which ports are encircled by conical valve seats countersunk below the inner face of the cylinder head and which inner face is formed with a channel extending between the inlet and outlet ports and which cylinder head is provided with means for the solid injection of fuel and with a passage for the fuel having an opening disposed in the channel terminating in the channel between the two valve ports, and inlet and outlet poppet valves respectively associated with said inlet and outlet ports and valve seats and having heads having cooperating conical seats on the heads thereof which conical seats on the inlet valve heads and around the inlet ports have faces which subtend an angle of less than 45° to a plane at right angles to the axis of the respective inlet port.

6. An internal combustion engine comprising a cylinder head in which are formed for each engine cylinder inlet and outlet ports spaced side by side and which ports are encircled by conical valve seats countersunk below an inner face of the cylinder head, and which inner face is formed with a channel extending between the inlet and outlet ports, said inlet and exhaust valves having heads having conical seats thereon, said seats on the inlet valve heads and around the inlet ports having faces which subtend an angle of less than 30° to a plane at right angles to the axis of the respective inlet port, and which cylinder head is provided with means for solid injection of fuel and with a passage for said fuel having an opening disposed close to the channel between the two valve ports.

References Cited in the file of this patent

UNITED STATES PATENTS

| 1,927,374 | Ricardo | Sept. 19, 1933 |
| 1,960,709 | Olenick | May 29, 1934 |
| 2,145,208 | Berstler | Jan. 24, 1939 |
| 2,658,493 | Kloss | Nov. 10, 1953 |
| 2,851,019 | Fleming et al. | Sept. 9, 1958 |
| 2,891,523 | Franke | June 23, 1959 |
| 2,893,371 | Schafer | July 7, 1959 |
| 2,921,571 | Vogel et al. | Jan. 19, 1960 |

FOREIGN PATENTS

| 108,436 | Great Britain | Aug. 9, 1917 |
| 513,906 | Great Britain | Oct. 25, 1939 |
| 945,301 | Germany | July 5, 1956 |